United States Patent [19]
McEwen et al.

[11] 3,755,945
[45] Sept. 4, 1973

[54] VEHICLE LICENSE PLATE HOLDER

[76] Inventors: Thomas A. McEwen, 7152 S.E. Harrison St.; Stanley L. Nelson, 11559 S.E. Powell Ct., both of Portland, Oreg.

[22] Filed: Mar. 29, 1971

[21] Appl. No.: 128,817

[52] U.S. Cl. .............................................. 40/209
[51] Int. Cl. ............................................. G09f 7/00
[58] Field of Search ...................... 40/210, 204, 200, 40/209

[56] References Cited
UNITED STATES PATENTS

| | | | |
|---|---|---|---|
| 2,709,314 | 5/1955 | Allen | 40/209 X |
| 1,864,641 | 6/1932 | Davis | 40/210 |
| 2,624,966 | 1/1953 | Baumgarten | 40/209 |
| 2,869,261 | 1/1959 | Audette | 40/209 |
| 2,910,793 | 11/1959 | Helmer et al. | 40/209 |
| 3,430,376 | 3/1969 | Drybread et al. | 40/209 |

Primary Examiner—Robert W. Michell
Assistant Examiner—Wenceslao J. Contreras
Attorney—Eugene M. Eckelman

[57] ABSTRACT

A license plate holder for vehicles designed to protect the license plate from damage. The license plate holder includes a recessed portion of a depth at least as thick as the license plate. The holder is ribbed for structural strength and is constructed of a semi-flexible, tough, non-tearable material such as polyethylene plastic designed to withstand vibrations and distortions to which the holder may be subjected by commercial car washing apparatus or other outside forces. An embodiment of the holder includes extension means having a face surface upon which advertising or personal lettering may be applied.

1 Claim, 5 Drawing Figures

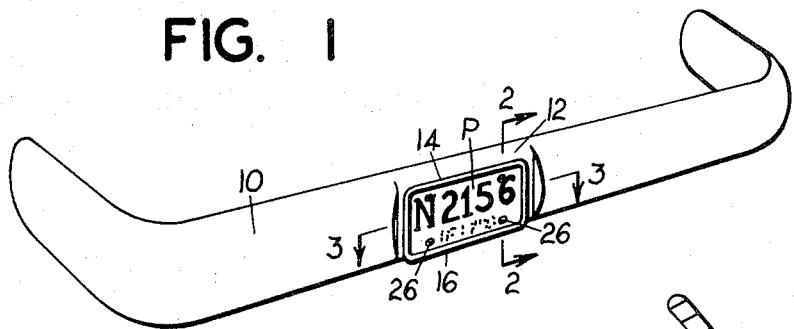
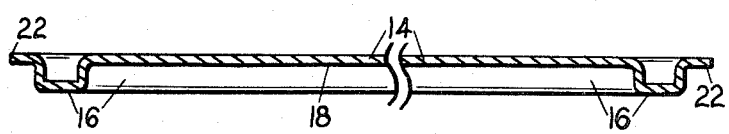
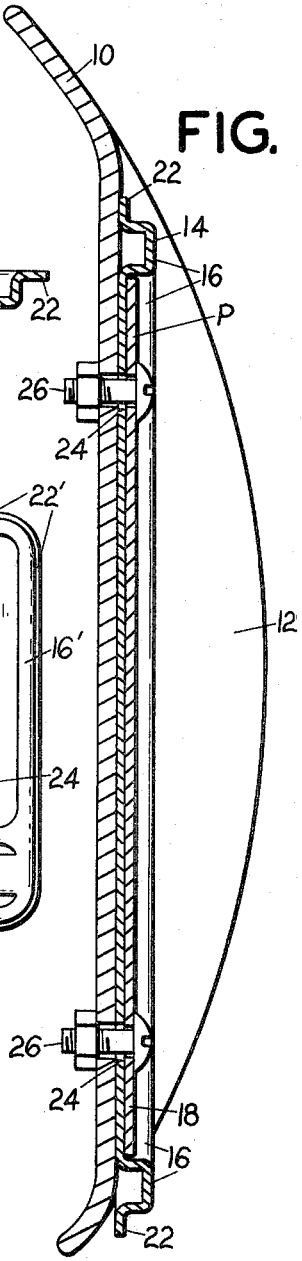

VEHICLE LICENSE PLATE HOLDER

BACKGROUND OF THE INVENTION

This invention relates to new and useful improvements in license plate holders for vehicles.

Various holders have been employed for vehicle license plates. Such holders are usually attached to the bumper or adjacent areas of the vehicle which obviously make them vulnerable to damage from outside forces. Some holders while being attractive nevertheless have little function for protecting the license plate. For example when a vehicle is put through a conventional commercial car wash of the type using large rotating brushes such brushes when moving across the front and back engage the holders and subject them to vibration and distortion forces causing them to break. Such loss of license plate holders is not only due to their structural makeup but also because of material from which they are made. License plates without holders are even more vulnerable to damage particularly from the brushes in commercial car washes.

SUMMARY OF THE INVENTION

According to the present invention and forming a primary objective thereof a vehicle license plate holder is provided which has a combination of features of being rugged in use and providing good protection for a license plate.

Still another object of the invention is to provide a license plate holder which is simplified in construction and inexpensive to manufacture.

A more particular object of the present invention is to provide a holder of the type described which is constructed of a tough, semi-flexible non-tearing material such as polyethylene plastic capable of fully withstanding existing outside forces from such elements as the cleaning brushes of commercial car washes, such holder including a body portion having a recess of a greater depth than the thickness of the license plate to fully protect the said plate.

Yet another object of the present invention is to provide a holder of the type described having a surface area capable of receiving advertising lettering or the like.

The invention will be better understood and additional objects and advantages will become apparent from the following description taken in connection with the accompanying drawings.

BRIEF DESCRIPTION OF THE DRAWINGS

FIG. 1 is a perspective view of a license plate holder of the present invention as applied to a vehicle bumper;

FIG. 2 is an enlarged vertical sectional view taken on the line 2—2 of FIG. 1;

FIG. 3 is an enlarged horizontal sectional view taken on the line 3—3 of FIG. 1, the bumper and license plate being omitted in this view;

FIG. 4 is a plan view of a modified form of holder; and

FIG. 5 is an enlarged vertical sectional view taken on the line 5—5 of FIG. 4.

DETAILED DESCRIPTION OF PREFERRED EMBODIMENTS

Referring in detail to the drawings and first to FIGS. 1, 2 and 3, the numeral 10 designates a vehicle bumper which as stated above usually comprises the support means for the license plate. The license plate P is generally bolted to a vertical surface of the bumper which may either comprise a flush surface of the bumper or a recessed area 12 in which the plate is partially protected. In either case, the license plate is not entirely protected from outside forces, particularly at the top and bottom, and damage is readily done to it and also to its holder by the rotating brushes of commercial car washing establishments or by other outside forces.

To provide good protection for the license plate and to preserve such plate, as well as to provide a long lasting holder, the invention comprises holding means 14 in the form of a solid, plate-like body portion having flat front and rear faces and being of an exterior dimension capable of being fitted in the recessed area 12. The holder of FIG. 1 includes a rib 16 formed therein which peripherally defines a rectangular recess 18 of a size to receive a license plate P. The dimension of the recess is such that the license plate fits closely adjacent to the inner edges of the rib 16 in order that the bristles of a brush, for example, of a commercial car washing machine cannot catch under the plate. In this regard also, the rib 16 is of a height greater than the thickness of the license plate so that the outer surface of the license plate is at least flush with or below the outer surface of the rib. Rib 16 is disposed inwardly from the outer edge of the plate 14 to provide a peripheral flange 22 which adds strength and provides an attractive appearance. Apertures 24 are provided in the holder to receive mounting bolts 26, these apertures being selectively spaced to provide alignment with the existing apertures in the license plates and bumper.

Important to the invention, the holder is constructed of a tough, semi-flexible, non-tearable material such as polyethylene plastic. The characteristics of this type of plastic are such that while it is sufficiently flexible to absorb vibration and some bending if necessary, it will not rupture or tear and has some resiliency. Thus, if the holder is subjected to even severe vibrations and bending forces from the brushes, it will not be damaged and will protect the license plate from damage. The holder, being tough and somewhat flexible, will also take minor bumps without damage thereto. The mounting holes 24 in the license plates are generally fairly close to the edges thereof and thus the mounting bolts 26 serve to hold the corner edges of the license plate down effectively in the holder to prevent the brushes of the washing machine from catching under them.

The body portion may have suitable coloring as desired such as matching colors for the license plate it is to hold or contrasting colors of the rib 16. Or, the outer or top surface of rib 16 may be painted to make the holder more attractive. Such paint is applied in any suitable manner to withstand the elements of the weather and commercial washing.

Referring in particular to FIGS. 4 and 5, an embodiment is disclosed wherein a body portion 14', which similar to FIG. 1, has a defining rib 16' as in FIG. 1 extending peripherally therearound. This embodiment also employs a flange 22' outwardly of the rib 16'. A recess 18' for receiving a license plate is formed in the body portion defined on three sides by the rib 16' and across the interior of the body portion by a rib 28. A pair of longitudinally extending recesses 30 terminating short of the ends of the holder define an enlarged rib 32 therebetween, one of such recesses 30 being adjacent to rib 28 and the other of said recesses 30 being parallel with an adjacent outside rib 16' at the bottom. In a preferred construction, rib 32 is widened so as to have a surface area 34 along its length on which advertising or personal lettering 36 is provided.

The embodiment of FIG. 4 employs the same advantages of the embodiment of FIG. 1, being constructed of a tough, semi-flexible, non-tearable material which will withstand the usual outside forces to provide good protection of the license plate. As stated, this embodiment carries advertising or personal lettering and may have suitable coloring as desired.

It is to be understood that the forms of our invention herein shown and described are to be taken as preferred examples of the same and that various changes in the shape, size and arrangement of parts may be resorted to without departing from the spirit of our invention or the scope of the subjoined claims.

Having thus described our invention, we claim:

1. A license plate holder for vehicles comprising a body portion having top and bottom ends and sides, said body portion assuming a full, single thickness plate-like construction with flat front and rear faces, said body portion having strengthening defining rib means across one of the ends, down the sides, and across the body portion spaced from the rib means on the said one end, said rib means forming a recess portion for receiving a vehicle license plate, said recess being of a depth at least as great as the thickness of a license plate and being only slightly larger than said plate whereby said plate is protected around all its edges from outside forces, said body portion also having first auxiliary rib means extending across said body portion outwardly of said rib means which is spaced from the said one end, said first auxiliary rib means having a face area for receiving advertising means, second auxiliary rib means across said body portion parallel with said first auxiliary rib means and disposed outwardly of the latter at the other end of said body portion, the rib means extending across the ends and sides being spaced inwardly from the outer peripheral edge of said body portion to form a peripheral strengthening flange, said body portion being constructed of a material having the characteristics of polyethylene plastic, and means in said body portion for fastening the latter to a vehicle.

* * * * *